(12) United States Patent
DeLanghe et al.

(10) Patent No.: US 7,806,639 B2
(45) Date of Patent: Oct. 5, 2010

(54) TRACK GUIDE FOR MOUNTING TO A BED OF A TRAILER

(75) Inventors: Ernest DeLanghe, Burnsville, MN (US); Matthew Pfankuch, Ogilvie, MN (US)

(73) Assignee: Caliber, Inc., Burnsville, MN (US)

( * ) Notice: Subject to any disclaimer, the term of this patent is extended or adjusted under 35 U.S.C. 154(b) by 916 days.

(21) Appl. No.: 11/413,452

(22) Filed: Apr. 28, 2006

(65) Prior Publication Data

US 2007/0253789 A1 Nov. 1, 2007

(51) Int. Cl.
*B65G 67/00* (2006.01)

(52) U.S. Cl. ................... 410/67; 410/2; 193/38

(58) Field of Classification Search ............ 410/2–4, 410/25, 27, 30, 66, 67; 119/847; 296/61; 414/537; 14/69.5, 71.1
See application file for complete search history.

(56) References Cited

U.S. PATENT DOCUMENTS

| 3,737,058 | A | * | 6/1973 | Johnson |
| 4,874,284 | A | * | 10/1989 | New, Jr. |
| 6,164,882 | A | * | 12/2000 | Selle ........................ 410/3 |

OTHER PUBLICATIONS

PowerMadd brochure, 2004, pp. 1-26.
PowerMadd Extreme Motorsports brochure, pp. 1-6.

* cited by examiner

*Primary Examiner*—Stephen Gordon
(74) *Attorney, Agent, or Firm*—Westman, Champlin & Kelly

(57) ABSTRACT

An apparatus for assisting in loading and unloading a snowmobile having spaced apart skis with runners extending from bottom surfaces thereof or for providing traction for loading and unloading a vehicle with a plurality of tires onto a trailer surface includes a base for attaching to the surface of the trailer. Upper surfaces of the base and bars reduces friction between the skis and surface of the trailer. The base also includes a trailing edge for providing traction for the plurality of tires for loading and unloading the vehicle.

6 Claims, 4 Drawing Sheets

TRACK GUIDE FOR MOUNTING TO A BED OF A TRAILER

BACKGROUND OF THE INVENTION

The present invention relates to a track guide for securing to a trailer bed or a truck bed. More particularly, the present invention relates to a segmented, grooved track which either reduces friction for snowmobiles or provides traction for vehicles when loading or unloading onto the bed of the trailer or the truck.

Snowmobiles and all terrain vehicles (ATV) are typically transported to and from a location for riding on a trailer or truck with a bed. However, positioning a snowmobile or an ATV on a trailer can be a difficult task because of the friction between snowmobile skis and the inclined or flat surface of a trailer or the lack of traction between the tires of the ATV with a smooth inclined or flat top surface of the bed.

A snowmobile ski typically include downwardly extending ribs separated by a concave channel. The ribs typically have runners extending substantially along a length of the rib. The runners are typically made of steel and engage the snow and terrain and prevent the ribs from eroding over time with use. However the metal runners also prevent the snowmobile from being easily positioned on the bed of a trailer or truck due to the friction between the metal runners and the bed.

An ATV typically has four tires that have a tread designed to operate in mud and/or snow. However, the tread can become filled with mud and/or snow such that it is difficult in gaining traction when driving the ATV onto the smooth bed of the trailer or truck. Also, the tires and bed can become wet and/or have ice coating on them which also may make driving the ATV onto the bed of the trailer or truck difficult due to the lack of traction.

SUMMARY OF THE INVENTION

The present invention includes an apparatus for loading and unloading a snowmobile having spaced apart skis with runners extending from bottom surfaces thereof or to provide traction for loading and unloading a vehicle with a plurality of tires onto a trailer having a flat or inclined surface. The apparatus includes a base for attaching to the surface of the trailer and wherein the base comprises an upper surface for loading and unloading the snowmobile by reducing friction between the skis and the surface of the trailer. The base includes a trailing edge for providing traction for the plurality of tines for loading and unloading the vehicle.

The present invention also includes an apparatus for transporting a snowmobile having spaced apart skis with runners extending from bottom surfaces thereof or a vehicle with a plurality of tires. The apparatus comprises a bed having a top surface. A first guide track comprising a first plurality of guides is secured to the top surface of the bed. Each of the first plurality of guides are spaced a selected distance apart from each other and wherein left and right edges of each of the first plurality of guides are substantially aligned to form the first guide track. The apparatus also includes a second guide track that is secured to the substantially flat top surface of the bed a selected distance from the first guide track where the second guide track comprises a second plurality of guides that are secured to the top surface of the bed. Each of the second plurality of guides are spaced a selected distance apart from each other where left and right edges of each of the second plurality of guides are substantially aligned to form the second guide track such that the skis of the snowmobile or the tires of the all terrain vehicle engage the first and second guide tracks while being positioned onto the bed.

The present invention also includes a method of retrofitting a trailer for transporting a snowmobile having spaced apart skis with runners extending from bottom surfaces thereof or an all terrain vehicle with a plurality of tires. The method comprises providing a bed having a top surface and securing a first guide track and a second guide track to the bed a selected distance apart from each other. The first guide track comprising a first plurality of guides secured to the substantially flat top surface of the bed. Each of the first plurality of guides are spaced a selected distance apart from each other such that left and right edges of each of the first plurality of guides are substantially aligned to form the first guide track. The second guide track includes a second plurality of guides secured to the top surface of the bed. Each of the second plurality of guides are spaced a selected distance apart from each other such that left and right edges of each of the second plurality of guides are substantially aligned to form the second guide track. The skis of the snowmobile or the tires of the all terrain vehicle engage the first and second guide tracks while being positioned onto the bed.

DETAILED DESCRIPTION

Figure 1:
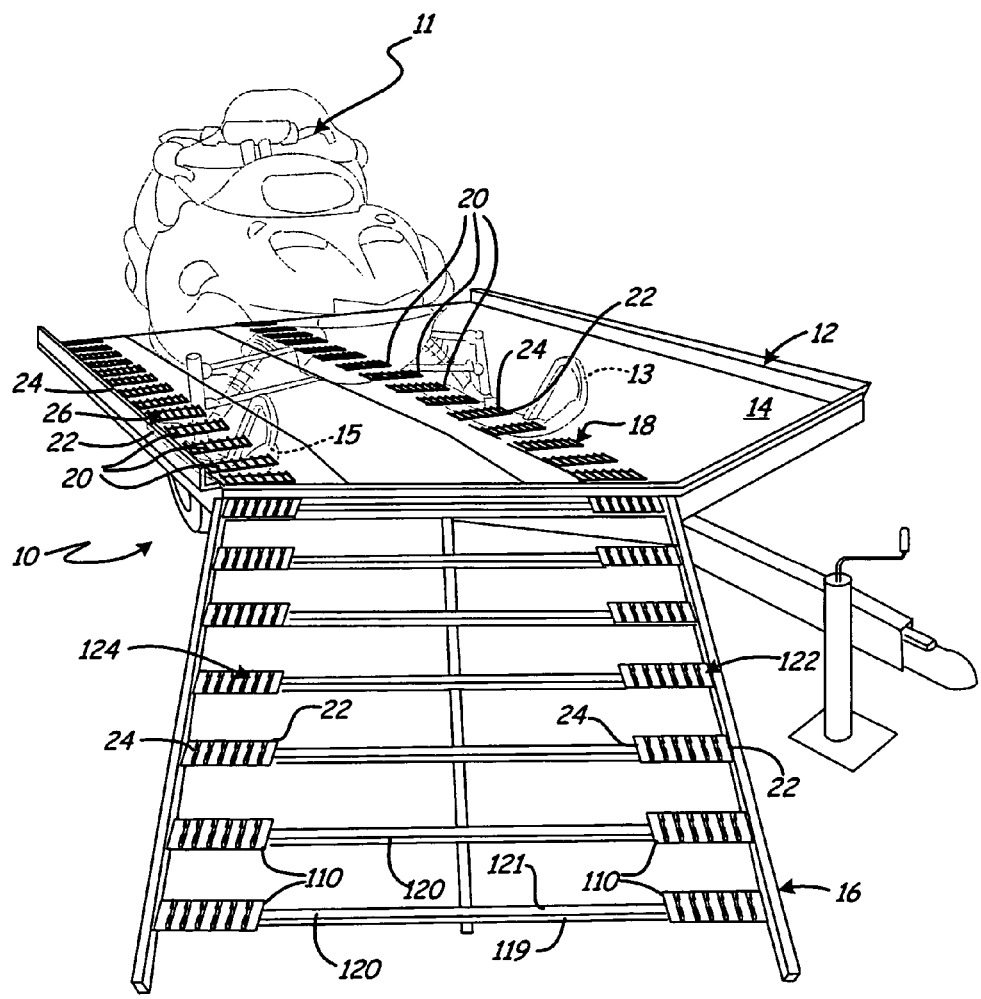
FIG. 1 is a perspective view of a trailer having first and second guide tracks for positioning a snowmobile onto a bed of the trailer.

A trailer retrofitted with at least left and right spaced apart guide tracks is generally illustrated in FIG. 1 at 10. The trailer 10 typically includes a bed 12 having a upper surface 14. The bed 12 may be inclined or declined to more easily load a snowmobile or a vehicle with tires onto the trailer 10. The trailer 10 may include a ramp 16 that attaches to an end of the trailer 10 to provide a structure from the ground to the substantially flat upper surface 14 of the bed 12.

The left guide track 18 includes a first plurality of guides 20 where each of the guides 20 is similarly constructed. Each of the guides 20 is spaced a selected distance apart from each other and have left and right edges 22, 24, respectively, that are substantially aligned to form the left guide track 18.

The right guide track 26 is positioned a selected distance from the left guide track 18 such that numerous makes and models of snowmobiles 11 having spaced apart skis 13, 15 and engage the left and right guide tracks 18, 26, respectively to reduce friction between the skis 13, 15 and the upper surface 14 of the bed 12. The right guide track 26 includes a second plurality of guides 20. Each of the guides 20 is spaced a selected distance apart from each other and have left and right edges 22, 24, respectively, that are substantially aligned to form the right guide track 26.

Figure 2:
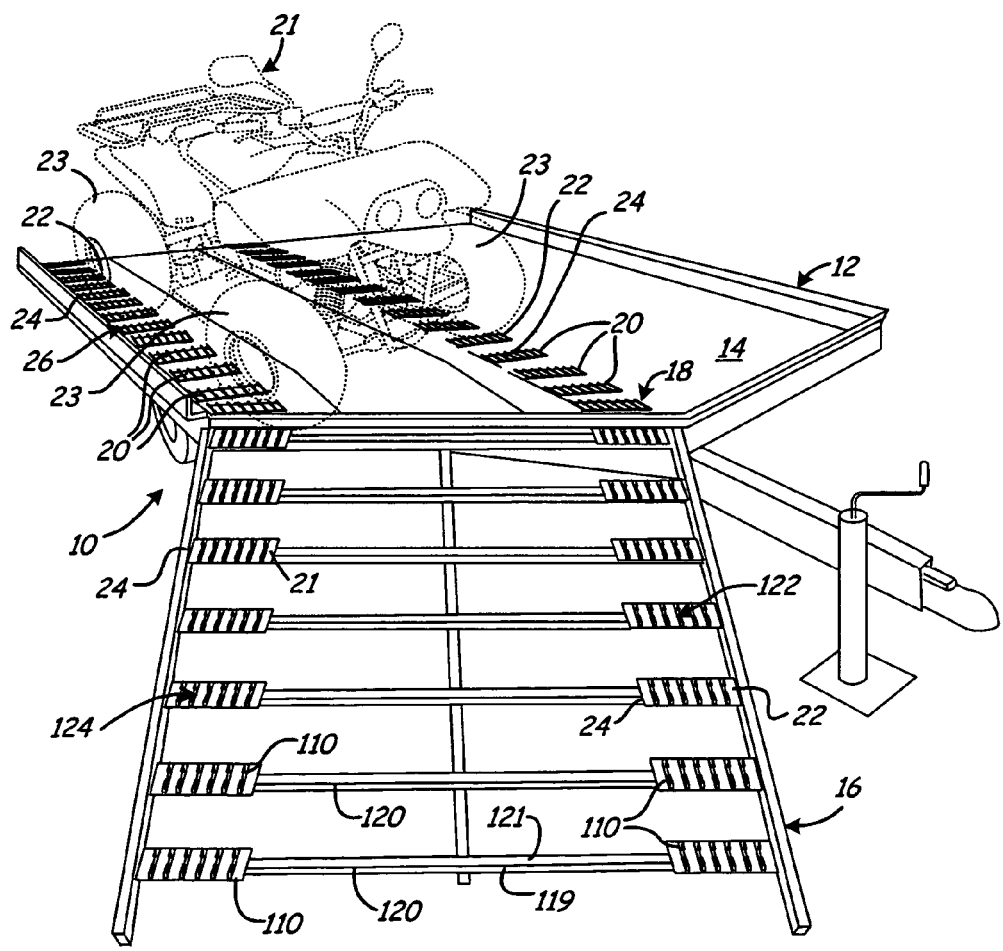
FIG. 2 is a perspective view of a trailer having guide tracks attached thereto for positioning an ATV onto the bed of a trailer.

Referring to FIG. 2, the left and right guide tracks 19, 26, respectively, are also useful in providing traction for loading and unloading an ATV 21 having a plurality of tires 23. While an ATV is illustrated in FIG. 2, the guide tracks 18, 26 having the plurality of spaced apart guides 20 are also useful in loading and unloading other vehicles from a trailer 10 of providing traction to tires on the vehicle.

Figure 3:
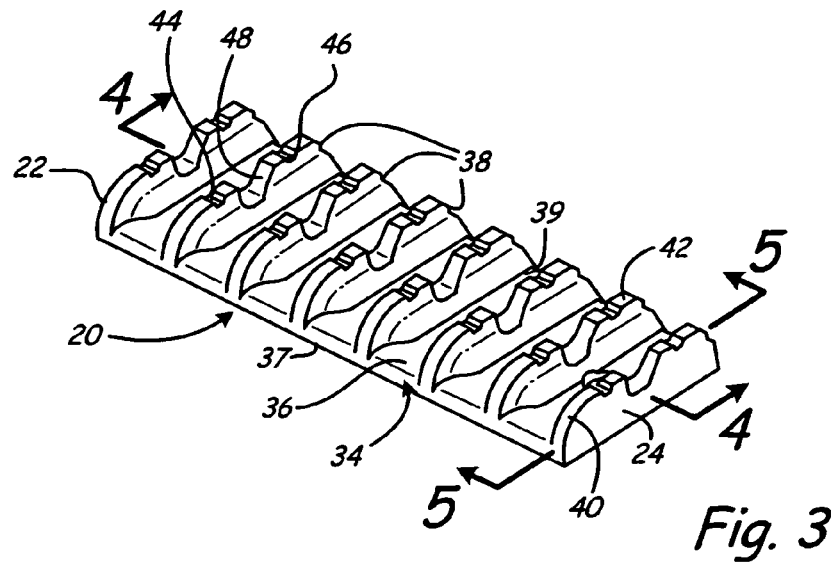
FIG. 3 is a perspective view of an embodiment of a guide of the present invention.
Figure 4:
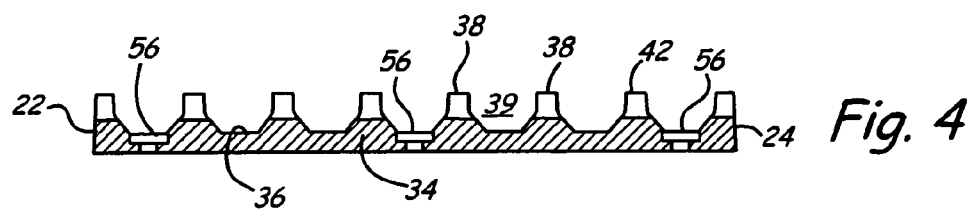
FIG. 4 is a sectional view along section line 4-4 in FIG. 3.
Figure 5:
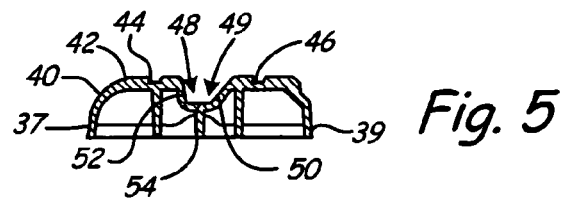
FIG. 5 is a sectional view along section line 5-5 in FIG. 3.
Figure 6:
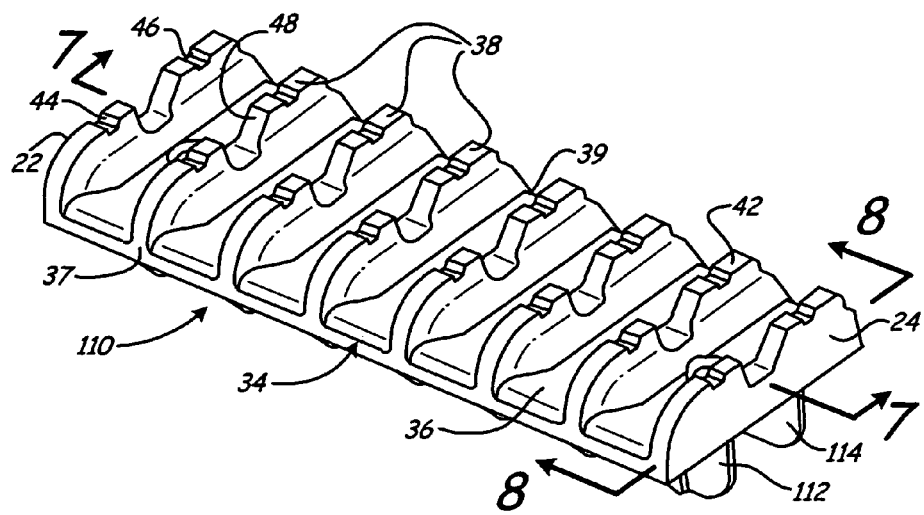
FIG. 6 is a perspective view of another embodiment of the guide of the present invention.
Figure 7:
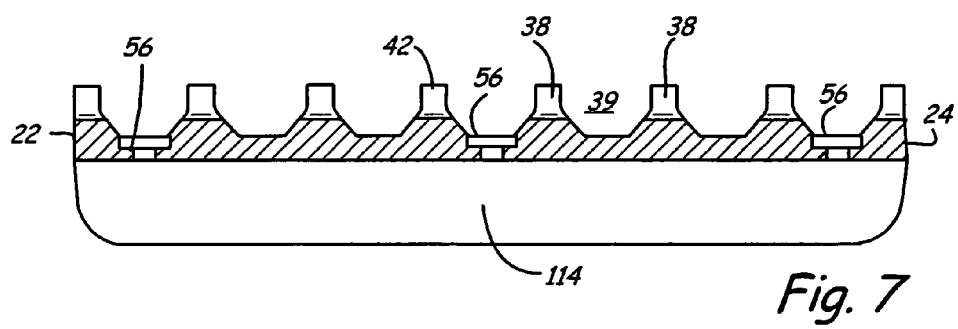
FIG. 7 is a sectional view along section line 7-7 in FIG. 6.
Figure 8:
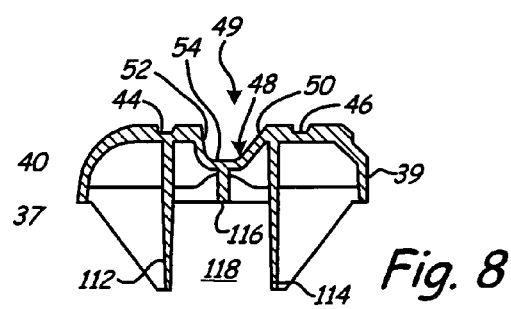
FIG. 8 is a sectional view along section line 8-8 in FIG. 6.

Referring to FIGS. 3-5, each guide 20 may include a plurality of spaced apart bars 38 extending from an upper surface 36 of a base 34. Typically, each guide 20 includes eight spaced apart bars 38 extending from a leading edge 37 to a trailing edge 39. However, a guide with two or more spaced apart bars 38 is within the scope of the present invention.

The skis 13, 15 of the snowmobile 11 engage the upper surface 36 of the base 34 and/or surface 42 to reduce friction between the upper surface 16 of the bed 14 and the skis 13, 15. While the upper surface 36 typically includes at least two bars 38 extending from the upper surface 36, a substantially flat upper surface 36 is within the scope of the present invention.

The leading edge 37 of each bar 38 includes a convex front surface 40 that aids in accepting a steel runner of a ski or a tire for a vehicle. The steel runner is positioned in a gap 39 between two of the bars 38 such that as the snowmobile is moved forward, the bars 38 guide the direction of the snowmobile onto the bed 14. An upper surface 42 of each bar 38 is substantially flat for sliding the ski over the guide 20.

The upper surface 42 also includes front and back slots 44, 46 that are separated by an indention 48. The front and back slots 44, 46 and the indention 48 interrupt the substantially flat upper surface 42 to provide traction for tires 23 of the ATV 21 to grip the guides 20 and position the ATV 21 on the bed 14. The trailing edge 39 also provides traction to the tires of the ATV 21 or vehicle.

The indention 48 includes a ramped front surface 50 for accepting a tread extending from the surface of the tire into the indention 48. The ramped front surface 50 increases a size of an opening 49 to the indention 48 to accept differently sized and shaped treads on the tires 23 of the ATV 21. The tread engages a substantially vertical back surface 52 and a substantially horizontal bottom surface 54 to provide traction to move the ATV forward.

The guide 20 typically has a length of about 8½ inches and a width of about 3 inches. Each bar 38 has a length of about 3 inches and the flat upper surface 42 has a width of about ¼ inch. The gap 39 at the upper surface 42 between the bars 38 is about 1 inch. However, a guide having different dimensions and configurations are within the scope of the present invention.

The guide 20 is typically constructed of a plastic polymer material through an injection molding process. However, the guide 20 can be constructed of any suitable material utilizing any suitable process.

The guide 20 are attached to the bed 14 typically with three fastening mechanisms, typically screws, that are individually positioned through apertures 56 positioned proximate the left and right edges 22, 24, and an aperture 56 substantially centrally located in each guide 20. However other fastening mechanisms may be used to attach the guides to the bed including a nail, a bolt and an adhesive.

Because the guides 20 are spaced apart to form the separated left and right tracks, 18, 26, respectively, the guides 20 can be utilized to retrofit any trailer irrespective of the length and width of the trailer. Also separating the guides 20 allows the snow and debris that is dislodged from the skis and/or tires to be removed from the guide 20 as the vehicle moves forward. The segmented track guides 18, 26 allow the track guides to remain substantially free of debris and allow for a more easy clean up once the snowmobile and/or ATV is removed from the bed 12.

Referring to FIGS. 1, 2 and 6-8 another embodiment of the guide of the present invention is generally illustrated at 110. The guide 110 is utilized to secure the guide to a bar 120 of the ramp 16. The guide 110 is similar to the guide 20 and includes the same base 34 and bar 38 configurations. The guide 110 includes spaced apart ridges 112, 114 that extend from the left edge 22 to the right edge 24. The ridges 112, 114 and a bottom surface 116 of the base define a channel 118 for accepting the bar 120. The guides 110 are attached to the spaced apart bars 120 to form third and fourth guide tracks 122, 124 that align with the first and second guide tracks 18, 26, respectively, to aid in loading or unloading either the snowmobile 11 onto or off of the bed 12 or to provide traction to the tires 23 of the ATV 21 to aid in positioning the ATV 21 onto the bed 12 or off of the bed 12.

The guide 110 are attached to the bars with fastening mechanisms as described with respect to the guide 20. However, the guide 110 is subjected to rotational stresses or torque as the tires 23 of the ATV 21 or the skis 13, 15 of the snowmobile 11 engage the guide 110. The spaced apart ridges 112, 114 engages side surfaces 119, 121 of the bar 120 to reduce the stresses or torque on the guides 110 attached to the bar 120.

The ramp 16 attaches to the bed 12 typically by raising an end of the ramp 16 to connect to a fastening device on the bed 12. However, a rotatable attachment of the ramp 16 to the bed 12 is also within the scope of the present invention.

Although the present invention has been described with reference to preferred embodiments, workers skilled in the art will recognize that changes may be made in form and detail without departing from the spirit and scope of the invention.

What is claimed is:

1. An apparatus for loading and unloading a snowmobile having spaced apart skis wherein each ski includes a runner extending from a bottom surface of the ski or to provide traction for loading and unloading a vehicle with a plurality of tires onto a trailer, the trailer having a substantially flat load bearing surface that can be inclined or declined, the apparatus comprising:

a base for attaching to the substantially flat load bearing surface of the trailer and wherein the base comprises an upper surface for loading and unloading the snowmobile by reducing friction between one of the spaced apart skis and the substantially flat load hearing surface of the trailer and a trailing edge for providing traction for loading and unloading the vehicle; and at least two bars extending from the upper surface of the base and wherein the at least two bars are substantially parallel such that the at least two bars and the upper surface of the base define a channel for accepting one of the runners of one of the spaced apart skis of the snowmobile to guide the snowmobile onto the trailer and wherein each of the bars has a flat top surface having an indentation comprising:

a substantially vertical hack surface extending from the substantially flat top surface of the bar to a selected distance into the bar;

a substantially horizontal bottom surface extending a selected distance from the substantially vertical surface; and a front surface extending from the substantially horizontal bottom surface to the substantially flat top surface of the bar.

2. The apparatus of claim 1 and wherein each of the at least two bars comprises a leading edge having a convex surface.

3. The apparatus of claim 1 and wherein each of the bars comprises an edge contained therein for engaging at least one of the plurality of tires of the vehicle.

4. The apparatus of claim 3 and wherein each of the bars further comprises at least one slot extending into the bar from the upper surface thereof.

5. The apparatus of claim 1 and wherein the base further comprises a plurality of through bores extending through the base from the upper surface of the base to a lower surface of the base and wherein fastening mechanisms are positioned through the plurality through bores and engage the trailer to secure the apparatus in a selected position on the trailer.

6. The apparatus of claim 1 and further comprising:

a first ridge extending from a bottom surface of the base; and a second ridge extending from the bottom surface of the base and wherein the first and second ridges are spaced a selected distance apart and wherein the first and second ridges and the bottom surface define a channel for accepting a bar of the trailer.

* * * * *

UNITED STATES PATENT AND TRADEMARK OFFICE
CERTIFICATE OF CORRECTION

| | | |
|---|---|---|
| PATENT NO. | : 7,806,639 B2 | Page 1 of 1 |
| APPLICATION NO. | : 11/413452 | |
| DATED | : October 5, 2010 | |
| INVENTOR(S) | : Ernest DeLanghe et al. | |

It is certified that error appears in the above-identified patent and that said Letters Patent is hereby corrected as shown below:

Claim 1, Column 4, Line 45, please replace the word "hearing" with -- bearing --

Signed and Sealed this

Thirtieth Day of November, 2010

David J. Kappos
*Director of the United States Patent and Trademark Office*